(12) United States Patent
Minchew et al.

(10) Patent No.: US 7,474,314 B2
(45) Date of Patent: Jan. 6, 2009

(54) METHOD FOR REPRESENTING TRUE COLORS WITH DEVICE-DEPENDENT COLORS ON SURFACES AND FOR PRODUCING PAINTS AND COATINGS MATCHING THE TRUE COLORS

(75) Inventors: Carl Minchew, Mountain Lakes, NJ (US); Patrick Tak Fu Chong, Spartanburg, SC (US)

(73) Assignee: Columbia Insurance Company, Omaha, NE (US)

( * ) Notice: Subject to any disclaimer, the term of this patent is extended or adjusted under 35 U.S.C. 154(b) by 639 days.

(21) Appl. No.: 11/032,248

(22) Filed: Jan. 10, 2005

(65) Prior Publication Data

US 2006/0155519 A1 Jul. 13, 2006

(51) Int. Cl.
*G09G 5/00* (2006.01)
*G09G 3/14* (2006.01)
*H04N 9/30* (2006.01)
*G06K 9/00* (2006.01)
*G03F 3/08* (2006.01)

(52) U.S. Cl. .............. 345/581; 345/589; 345/591; 345/593; 345/46; 348/101; 348/791; 358/518; 382/162; 382/167

(58) Field of Classification Search .............. 345/581, 345/589–594, 597, 600–604, 629–630, 22, 345/39, 41, 44–48, 77, 63–64, 82, 84, 87–88; 382/162–167, 318–319; 358/515–525, 505; 348/93, 96–111, 297–280, 675, 790–792, 348/801–808
See application file for complete search history.

(56) References Cited

U.S. PATENT DOCUMENTS

| | | | | |
|---|---|---|---|---|
| 3,749,472 A | | 7/1973 | Young | |
| 4,807,095 A | | 2/1989 | Bell | |
| 5,590,251 A | * | 12/1996 | Takagi | ............... 345/604 |
| 5,751,829 A | * | 5/1998 | Ringland et al. | ............ 382/100 |
| 6,016,038 A | | 1/2000 | Mueller et al. | |
| 6,122,391 A | * | 9/2000 | Ringland et al. | ............ 382/100 |
| 6,150,774 A | | 11/2000 | Mueller et al. | |

(Continued)

FOREIGN PATENT DOCUMENTS

CA    2302227    7/2004

OTHER PUBLICATIONS

Jeff Tyson, "How Computer Monitors Work", Howstuffworks, Nov. 17, 2004, pp. 1-8.

(Continued)

*Primary Examiner*—Wesner Sajous
(74) *Attorney, Agent, or Firm*—The H.T. Than Law Group

(57) ABSTRACT

A method for selecting paints is disclosed. This method includes the steps of selecting true paint colors, displaying device-dependent colors corresponding to the true paint colors in a simulated full size room and interacting with the buyers to change the displayed colors and select the desired colors. The method also includes the step of dispensing paints corresponding to the selected colors. The displayed colors are generated by multiple color and/or white LEDs to provide a wider gamut of displayable colors and more color saturation and chromatic. A full-size apparatus for displaying paint colors using device-dependent colors is also disclosed.

51 Claims, 5 Drawing Sheets

U.S. PATENT DOCUMENTS

| | | | |
|---|---|---|---|
| 6,166,496 | A | 12/2000 | Lys et al. |
| 6,211,626 | B1 | 4/2001 | Lys et al. |
| 6,259,430 | B1 | 7/2001 | Riddle et al. |
| 6,292,901 | B1 | 9/2001 | Lys et al. |
| 6,340,868 | B1 | 1/2002 | Lys et al. |
| 6,343,264 | B1 | 1/2002 | Fenton et al. |
| D457,667 | S | 5/2002 | Piepgras et al. |
| D457,669 | S | 5/2002 | Piepgras et al. |
| D457,974 | S | 5/2002 | Piepgras et al. |
| D458,395 | S | 6/2002 | Piepgras et al. |
| D463,610 | S | 9/2002 | Piepgras et al. |
| 6,459,919 | B1 | 10/2002 | Lys et al. |
| D468,035 | S | 12/2002 | Piepgras |
| 6,528,954 | B1 | 3/2003 | Lys et al. |
| 6,548,967 | B1 | 4/2003 | Dowling et al. |
| 6,577,080 | B2 | 6/2003 | Lys et al. |
| 6,608,453 | B2 | 8/2003 | Morgan et al. |
| 6,624,597 | B2 | 9/2003 | Dowling et al. |
| 6,628,829 | B1 | 9/2003 | Chasen |
| 6,717,376 | B2 | 4/2004 | Lys et al. |
| 6,717,584 | B2 | 4/2004 | Kulczycka |
| 6,720,745 | B2 | 4/2004 | Lys et al. |
| D491,678 | S | 6/2004 | Piepgras |
| D492,042 | S | 6/2004 | Piepgras |
| 6,774,584 | B2 | 8/2004 | Lys et al. |
| 6,777,891 | B2 | 8/2004 | Lys et al. |
| 6,781,329 | B2 | 8/2004 | Mueller et al. |
| 6,788,011 | B2 | 9/2004 | Mueller et al. |
| 6,801,003 | B2 | 10/2004 | Schanberger et al. |
| 6,806,659 | B1 | 10/2004 | Lys et al. |
| 6,869,204 | B2 | 3/2005 | Morgan et al. |
| 6,883,929 | B2 | 4/2005 | Dowling |
| 6,888,322 | B2 | 5/2005 | Dowling et al. |
| 6,897,624 | B2 | 5/2005 | Lys et al. |
| 2001/0036309 | A1 | 11/2001 | Hirayama et al. |
| 2003/0052890 | A1 | 3/2003 | Raskar et al. |
| 2003/0095135 | A1 | 5/2003 | Kaasila et al. |
| 2003/0100332 | A1* | 5/2003 | Engstrom et al. ........... 455/550 |
| 2003/0164927 | A1* | 9/2003 | Tsukada ..................... 353/31 |
| 2004/0247484 | A1 | 12/2004 | Yerazunis |
| 2005/0128484 | A1* | 6/2005 | Rodrigues et al. .......... 356/402 |

OTHER PUBLICATIONS

Tom Harris, "How Light Emitting Diodes Work", Howstuffworks, Sep. 8, 2004, pp. 1-6.

"STMicroelectronics Introduces New White LED Driver with Specific Feature for Small LCD Module Backligh",Yahoo Finance, Nov. 5, 2004, p. 1.

"Colorblaze 72", Color Kinetics.

International Search Report and Written Opinion for PCT/US06/00359 Mailed on Sep. 25, 2007.

"iColor Tiles", Modern Contemporary Design, Color Kinetics, Jan. 27, 2004.

"iColor Tile FX", The Pioneer of Intelligent Let Illumination Technologies, Color Kinetics.

* cited by examiner

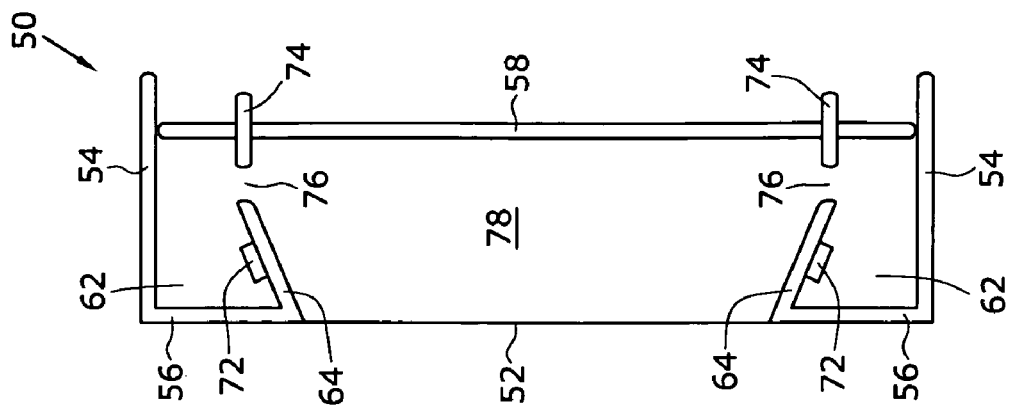
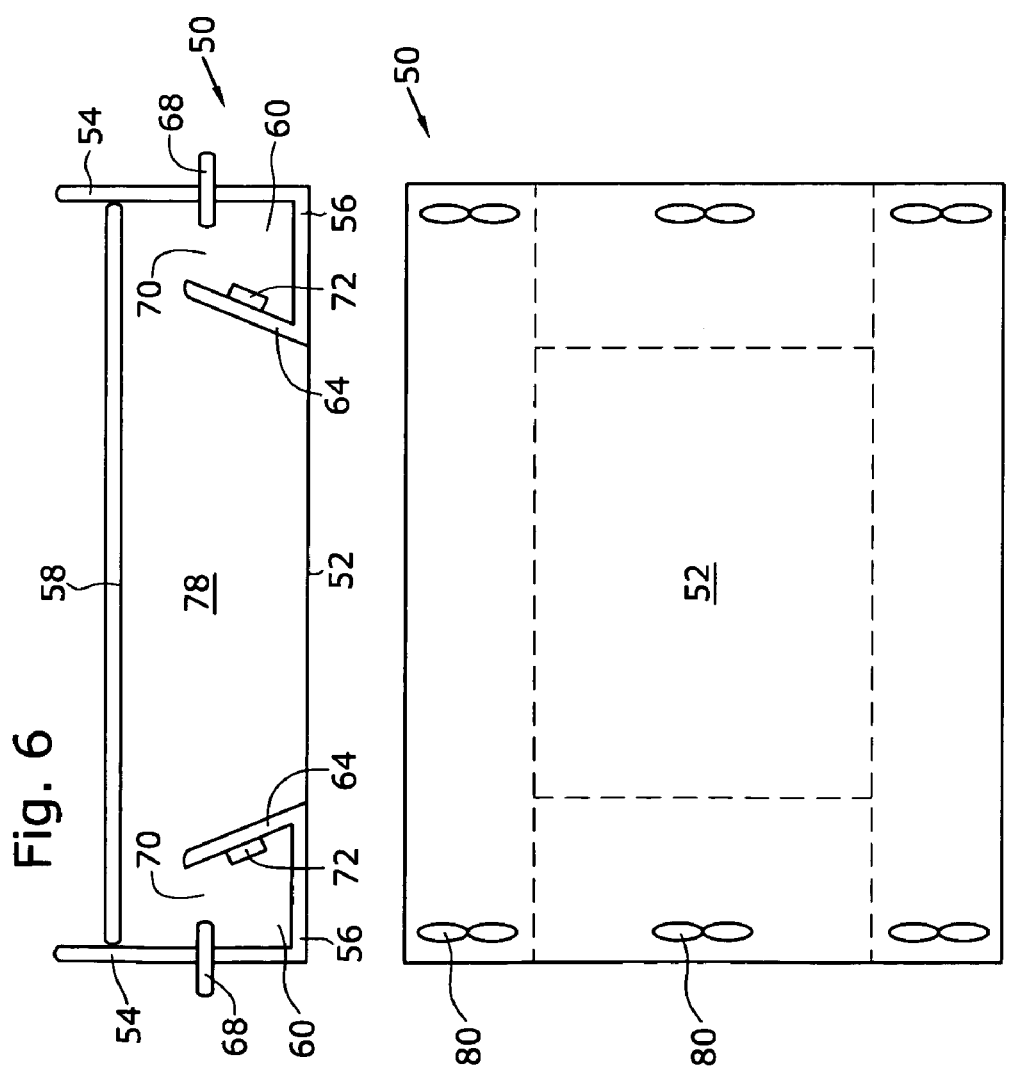

METHOD FOR REPRESENTING TRUE COLORS WITH DEVICE-DEPENDENT COLORS ON SURFACES AND FOR PRODUCING PAINTS AND COATINGS MATCHING THE TRUE COLORS

FIELD OF THE INVENTION

This invention generally relates to a system of representing true colors with device-dependent colors on surfaces, such as full size walls and furniture, and to produce paints or other coatings matching the device-dependent colors displayed on such surfaces. The invention is also directed to a full size room or portions thereof that can display one or more device-dependent colors for users to view and a method of producing paints that match the displayed colors.

BACKGROUND OF THE INVENTION

Before purchasing paints, buyers typically are given a fan or palette comprising hundreds or thousands of very small paint chips, which represent the available paint colors, and the buyers would place the individual chips next to a wall to try to determine whether the colors on the chip are acceptable. The chips typically measure about 1¼ inch by 2 inches, but the walls are typically hundreds of times larger. Hence, it is difficult for the buyers to mentally project the colors on the chips over the entire surface of the walls. Recently, the buyers can purchase larger paint chips of about 12 inches by 12 inches to assist the buyers with the mental projection of the colors to the walls. However, the chips can be expensive, and the mental projection remains unsatisfactory. Alternatively, the buyers may purchase small containers of about 2 ounces of the desired paints to paint larger swatches on the walls. Typically, the buyers start with small paint chips to narrow the choices and then move to larger paint chips and/or sample paints before choosing the final colors. This selection and purchasing process can be time consuming and frustrating for the buyers.

In a recent study, it was determined that the perceived lightness and chroma of the paint under two light sources change when the view changes from small color patches to wall size rooms, while the perceived hue remained unchanged. The effects caused by size were found to be independent of light sources and matching methods. See K. Xiao, M. Luo, C. Li, P. Rhodes and C. Taylor, "Specifying the Colour Appearance of a Real Room," presented at the IS&T/SID 11th Color Imaging Conference, Scottsdale, Ariz. (2003). This study confirms the buyers' difficulty of selecting paints from paint chips.

Recently, paint viewing or paint selection software, such as Benjamin Moore & Co. Personal Color Viewer™ ("PCV") available either on the World Wide Web or as CD-ROM, has improved the paint selection process for the buyers. The PCV software displays on a computer screen a number of standard interior rooms with furniture, e.g., living room, dining room, bedrooms, kitchen and bathroom, as well as the exteriors of a dwelling. The buyers can change the colors of the room, including ceiling, trim and upper and lower walls, at will to project the colors to the entire room. Additionally, digital images of the buyers' own dwellings can be manipulated by PCV to display the desired colors.

One possible drawback of any of the paint selection software is that the images are typically displayed on computer screens. Hence, the buyers must also mentally project the images and paint colors to full size walls and rooms. Another computer screen based color display system is disclosed in U.S. Pat. No. 6,717,584 B2, and the disclosure of which is incorporated herein by reference in its entirety. This reference discloses a method and apparatus for visualizing virtual paints on a computer-generated automobile. This method accounts for multiple environmental and surface factors. Reflectivity of the paints, which is caused by metal flakes or special effect pigments in the paints, and the angle at which the automobile is viewed affect the display of the virtual paints. The computer-generated automobile painted with the virtual paints is then displayed on one or more computer screens.

On the other hand, the walls in some public buildings, such as airports, have the capability of changing colors due to the lights that are projected on to them. For example, some of the walls in the Detroit airport are illuminated by LEDs. The colors and patterns on these walls can be changed at will by altering the outputs of the LEDs. No attempt is made to match the displayed color to a true color or device independent color, and uniformity of colors on the walls is not a concern. Methods of changing colors projected onto a surface are described in U.S. Pat. Nos. 6,259,430 B1, 6,340,868 B1, 6,150,774 and 6,016,038 and European patent number 1,016,062. The disclosures of these patent references are incorporated by reference herein in their entireties.

However, there remains a need in the art for a system of displaying or simulating true paints on full size walls to assist the buyers in selecting paints.

SUMMARY OF THE INVENTION

The present invention includes a method for selecting paints. This method has at least the steps of selecting true paint color(s), displaying device-dependent color(s) corresponding to the true paint color(s) in a simulated full size room, and interacting with the buyers to change the displayed color(s) and select the desired color(s). The method can also include the step of dispensing paint(s) corresponding to the selected color(s). The displayed color(s) can be generated by multiple color and/or broad band LEDs to provide a wider gamut of displayable colors and more color saturation and chromatic. This method can also suggest to the buyers harmonious or compatible colors.

The present invention also includes an apparatus for displaying paint color(s) comprising a wall portion sized and dimensioned to be substantially similar to a full size wall. A device-dependent color is displayed uniformly on a front surface of the wall portion. The device-dependent color has color coordinates that are substantially similar to the color coordinates of the paint color, and wherein a light, e.g., LEDs, displaying the device-dependent color is diffused before illuminating the front surface of the wall portion. The inventive apparatus can also have a color library storing the color coordinates for the device-dependent colors, and the color coordinates of the paint color(s) can be matched to corresponding color coordinates in the color library. The inventive apparatus can also include a user input device to communicate with the consumer to input or select paint colors.

BRIEF DESCRIPTION OF THE DRAWINGS

In the accompanying drawings, which form a part of the specification and are to be read in conjunction therewith and in which like reference numerals are used to indicate like parts in the various views:

FIG. 5 is a front view of a display wall in accordance to an embodiment of the present invention;

FIG. 6 is a cross-sectional top view of the wall of FIG. 5; and

FIG. 7 is a cross-sectional side view of the wall of FIG. 5.

DETAILED DESCRIPTION OF THE PREFERRED EMBODIMENTS

Figure 1:
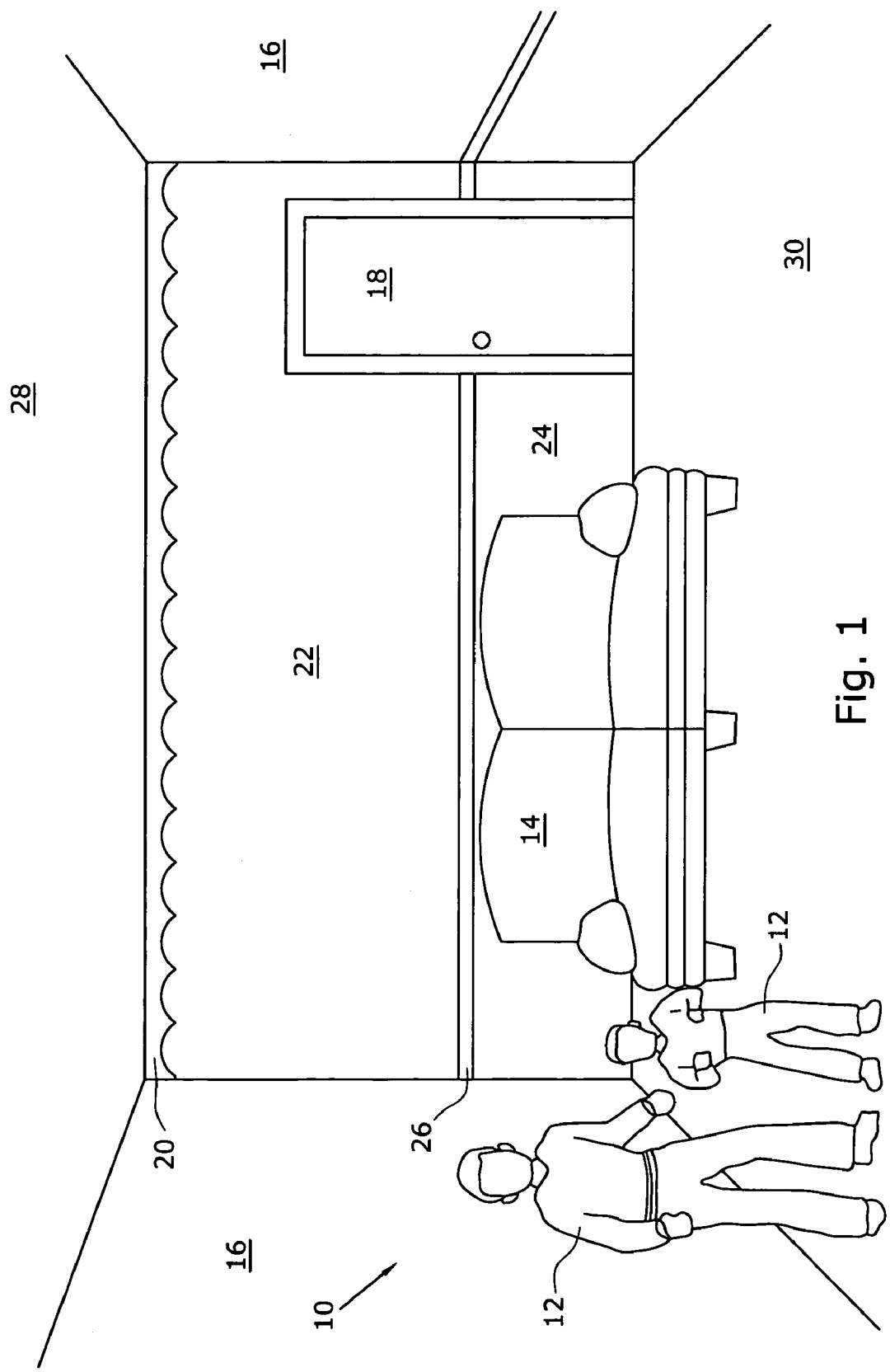
FIG. 1 is a schematic perspective view of a full size three-dimensional apparatus in accordance to an embodiment of the present invention.

As used herein, "true colors" or "device-independent colors" denote colors that are visible to the eyes without the need of a device, such as computer equipment, televisions, diodes, light emitting diodes (LEDs), projectors, computer displays, screens or the like. True colors of a surface include those that are visible when light reflects off that surface, or those that can be produced by pigmented compositions coated on the surface, such as paints and coatings. On the other hand, "device-dependent colors" are colors produced by the devices listed above. Typically, the device-dependent colors are produced within the devices by combinations of the spectral ranges within the visible radiation spectrum of electromagnetic radiation. The wavelengths of visible radiation spectrum range from below about 400 nm (violet) to above about 700 nm (red). In one example, the device-dependent colors can be created by combining different amount of the three primary colors: red (625 nm-740 nm), green (520 nm-565 nm) and blue (435 nm-500 nm) or RGB, e.g., RGB computer monitors. The RGB convention represents approximate emission bands of wavelengths. Device-dependent colors can also be produced by mixtures of four process colors: cyan (500 nm-520 nm), magenta (380 nm-435 nm), yellow (565 nm-590 nm) and black (approximately 345 nm-400 nm) or CMYK, e.g., offset printing of color documents. The CMYK convention represents approximate absorption bands of wavelengths. Device-dependent colors based on RGB convention can be converted by known color management systems to CMYK convention and vice versa.

In accordance with the present invention, a full size or life size display apparatus or structure is constructed to resemble the interior and/or exteriors of dwellings such as detached homes, condominiums or apartments, office buildings, public buildings or other structures. Such full size structures may also contain furniture, such as sofas, couches, desks, tables, chairs, etc. The wall surfaces of the inventive full size structures are adapted to display device-dependent colors that match the true colors of paints or other coatings, preferably commercially available paints. The buyers can select and re-select any colors to be displayed on any surface. The apparatus can also suggest colors matching the selected colors. The apparatus can interact with the user through keyboarding, scanning devices capable of scanning colors brought by the buyers, voice recognition devices, or other forms of communication. The furniture can also display a variety of colors or patterns matching the furniture in the buyers' homes or offices. After the buyers select a color or suite of colors based on the apparatus' display, the apparatus communicates the selected device-dependent colors to the factory, which can be located close to or far away from the full size display apparatus, to produce device-independent paints to be shipped or otherwise delivered to the buyers. As used herein, "paints" include paints, veneers and all other coatings.

Referring to FIG. 1, the inventive system of the present invention comprises a full size structure or room 10. In accordance with an embodiment of the present invention, room 10 is sized and dimensioned to be substantially the same size as a normal, actual room, e.g., individual offices, living rooms, bedrooms, dining rooms, kitchens, etc. Room 10 should be sufficiently large for buyers 12 to fit therewithin and provides buyers 12 with the sensation of being within a normal room. Preferably, room 10 is provided with furniture 14, e.g., sofas, couches, chairs, tables, etc. to maximize the buyers' ability to perceive how the displayed paint colors would look in an actual room. Room 10 comprises a plurality of walls 16 and one or more door 18. Walls 16 may also have crown molding 20, and walls 16 may be divided into upper portion 22 and lower portion 24 divided by chair rail or side molding 26. Room 10 may also have ceiling 28 and floor 30.

Each element 14, 16, 18, 20, 22, 24, 26, 28 or 30 may display a separate device-dependent color or all portions of room 10 can display the same device-dependent color. Additionally, walls 16, i.e., elements 18, 20, 22, 24 and 26, can display one color depending on the buyers' choice or taste.

Figure 2:
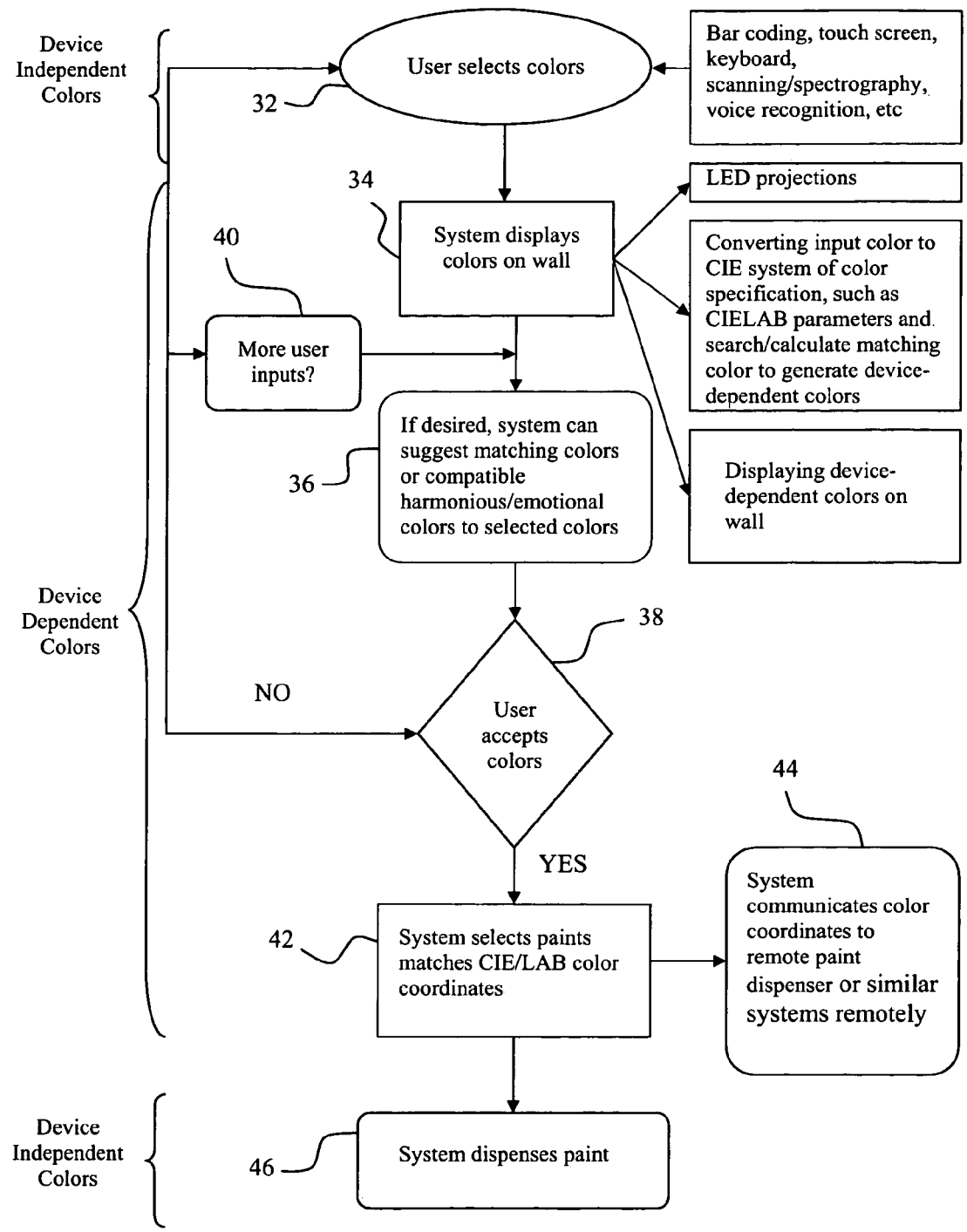
FIG. 2 is a schematic flow chart depicting an embodiment of the present invention.

FIG. 2 illustrates an exemplary method of the present invention designed to assist the buyers with color and paint selection. The exemplary method comprises a plurality of steps. First, in step 32 the buyers or users select a true or device-independent color or colors to be displayed in room 10. The buyers can communicate the selected true color(s) to a controller or central processing unit (CPU) controlling room 10 in a variety of ways. One way is for the buyers to select a true color from a palette, such as Benjamin Moore's Color Preview™. For example, the buyers may choose the "sun porch" color, which is a shade of yellow. This color has a unique identification number (P-700)(3B)2023-30. The user may input the name of this color and/or the unique identification number via touch screen or alphanumeric keypad (not shown in FIG. 1) to the CPU. Alternately, the CPU may also have voice recognition capability to interact with the buyers.

In another example, the buyers may bring an unidentified color not belonging to any color system or palette. Room 10 may be provided with a scanner capable analyzing the color by spectrography and either matches that color to the closest device-dependent color stored within a library in the CPU or ascertains a combination of spectral electromagnetic radiation bands to produce a device-dependent color matching the unidentified true color, as described below.

Figure 3:
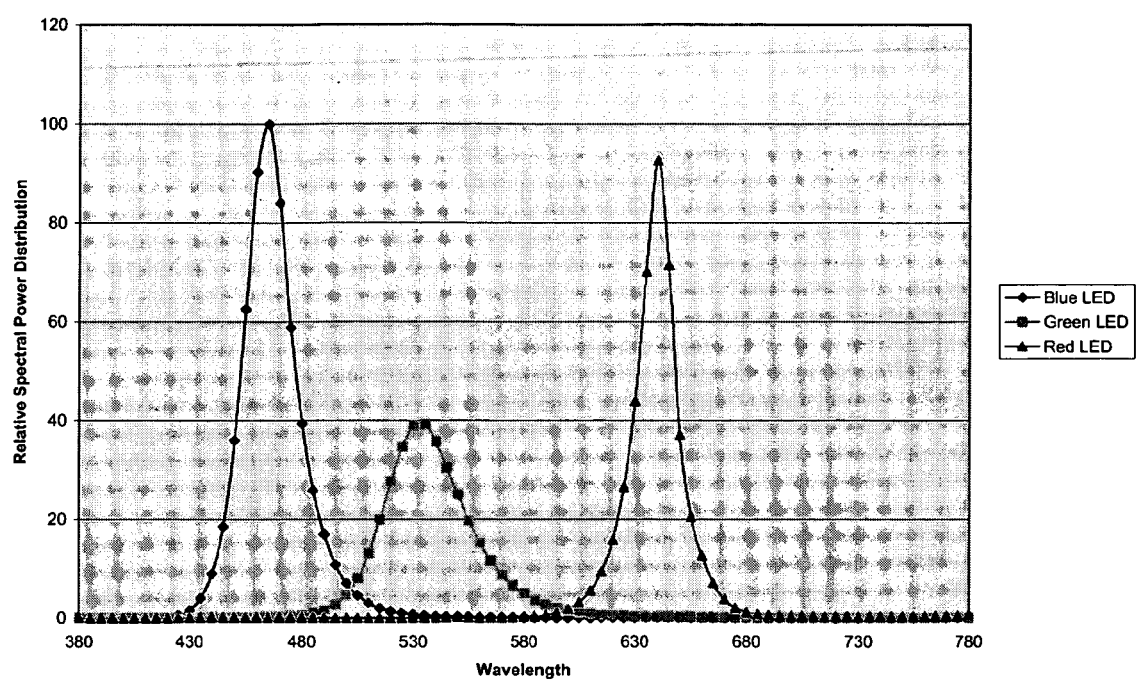
FIG. 3 is a representative graph of combining visible electromagnetic radiation bands to produce device-dependent color(s)

After the buyers input the initial color by any of the means described above, in step 34 the CPU then may look up in the internal library for the combination of visible electromagnetic radiation bands based on the RGB or CMYK or another convention utilizing more colors described below that reproduces the selected color(s) with device-dependent colors in room 10. If the input color is a known color or a color in the palette, the corresponding combination of visible radiation bands is readily available. Each band represents a device-dependent primary or process color, and the combination of the wavelengths of the bands produces the combined device-dependent color to be displayed on wall 16 or components thereof, as illustrated in FIG. 3. As shown, the display color is the combination of the intensity of the radiation bands centered at about 470 nm (cyan), about 518 nm (green) and about 640 nm (red). Each peak represents a device-dependent primary or process color. The selection of the peak spectra and colors is discussed below.

If the input color is a previously unknown color, the spectrograph device can scan the input color and can match the color to a known color. The buyers have the option to accept the proposed matching color, or may instruct the CPU to produce a device-dependent color based on the information relating to the scanned color. In accordance with one aspect of the present invention, the CPU compares the scanned color to the internationally recognized CIE Chromaticity Diagrams. Once a closest match is found, the CPU can calculate or ascertain the combination of wavelengths to display the color on the wall. There are several CIE Chromaticity Diagrams: the CIE 1931 Chromaticity Diagram (based on two degree CIE Standard Observers) and the CIE 1964 Chromaticity Diagram (based on ten degree CIE Standard Observers). In 1976, CIE published tow new uniform spaces: CIELAB and CIELUV. All these CIE recommendations can be used with the present invention. Other color order systems or color specifiers such as Pantone, Natural Color System, Munsell Color System, Hunter LAB system or the like, can also be used with the present invention. Some of these systems can be converted to the CIE diagram, e.g., the Munsel systems are convertible to CIE In FIG. 4, the well-known shark-fin shape of the 1931 CIE diagram is shown. The shark-fin shape substantially represents all the colors visible to the human eye. The corners of the diagram are red, blue-magenta and green. The center of the diagram is white, which indicates that white light is the combination of all the individual perceived colors, and that white light can be divided into the other colors, e.g., by a prism. The inner triangle superimposed on the shark-fin has the three apices located in the red, green and blue regions of the CIE diagram. This RGB triangle represents the portion of the CIE diagram that can be displayed using the RGB convention. Since most computer screens utilize the RGB convention, a significant number of colors cannot be displayed on computer screens. The outer irregular polygon superimposed on the CIE diagram encompasses the RGB triangle, and each apex of this polygon represents an individual color that can be produced by a device, e.g., an LED. As illustrated, eleven separate LEDs, each displaying a different color, can be used to expand the gamut of colors that can be displayed on walls 16 or components thereof. In other words, the color LEDs are used to stretch the RGB triangle. Hence, room 10 in accordance with the present invention can display colors that cannot be viewed on common RGB screens or CMYK printers, because a larger number of color LEDs can be employed in room 10. The present invention is not limited to any number of LEDs or any particular color combination. Preferably at least five LEDs emitting different color light are used. More preferably, nine to eleven LEDs are used. Unique or different combinations of LEDs can be used to satisfy the particular application.

Color LEDs are widely available from many sources. Available LEDs can emit narrow bands of wavelengths or colors, such as the wavelength bands shown in FIG. 3. LEDs are also available in broad bands, such as white LEDs. Broadband LEDs are generally produced by combining the entire available colored or narrow band LEDs to produce white or near white light. Broadband LEDs are commercially available through STMicroelectronics of Geneva, Switzerland, among other sources. An exemplary method of using narrow band and/or broadband LEDs in room 10 are discussed below in reference to FIGS. 5-7.

Walls 16 of room 10 or components thereof can be illuminated by a plurality of LEDs to display colors that are as close to the true colors as possible, and closer to true colors than heretofore available on computer screens or from offset printers. As can be seen from FIG. 4, the more colors that can be used in combination to produce the display colors, more of the true visible to the eyes can be displayed in room 10.

In an alternative embodiment, walls 16 or components thereof can be illuminated by LEDs, transistors or photocells constructed from organic polymers, available from Cambridge Display Technology or Plastic Logic Ltd. Polymer light emitting devices are disclosed in U.S. Pat. Nos. 5,807,627, 5,747,182, 5,653,914, 6,777,706, 6,723,811, 6,580,212, 6,559256, 6,498,049, and United States published patent applications 2004/0214039, 2004/0132226, 2004/0075381, 2004/0059077, 2003/0166810, 2003/0008991, and related patent references, including patent references sharing at least one inventor with the cited patent references. These references are incorporated by reference in their entireties.

After the device-dependent colors are determined by the CPU, the selected colors are displayed in room 10 in step 34. In step 36, the CPU may automatically display additional device-dependent colors that complement the selected colors. Colors that are considered harmonious or are pleasing in combination with the selected colors can be suggested. For example, if buyers 12 select a particular color for wall 16, complementary colors can be displayed on crown molding 20, chair rail 26, door 18, or ceiling 28. Complementary colors can be stored in databases or other libraries accessible by the CPU. Additionally, the CPU may execute a procedure for selecting groups of colors in harmony in accordance to a tintometric system. Such procedure is described in PCT publication no. WO 03/027958, which is incorporated herein by reference in its entirety.

Next, in step 38 the buyers decide whether to accept the displayed colors or make other color selections. If the buyers wish to see more colors, the CPU in step 40 asks for more inputs or for changes that the buyers want to make and change the display in room 10. This interactive communication continues until the buyers select satisfactory paint and paint colors.

As mentioned above, the buyers may also select the colors of the furniture 14 and floor 30 to match their home furniture and floor covering as closely as possible. In another aspect of the present invention, the color displayed on furniture 14 and floor 30 can be controlled. Preferably, furniture 14 and floor 30 are made from textiles that are made at least partially from optical fibers. Optical fibers are an excellent light carrier and device-dependent color(s) can be transmitted into the optical fibers to display the desired color. Preferably, the textile can be a woven material or a nonwoven made from filament fibers. In one example, every $n^{th}$ fiber in the woven or nonwoven is an optical fiber, and the color projecting from these fibers can change the color of the furniture or flooring. The '430 patent, already incorporated by reference, discloses one example of a woven material with optical fibers weaved therein.

Referring again to FIG. 2, after the buyers accept the device-dependent colors in step 38, then in step 42 the system can convert the color coordinates of the device-dependent paint on the C.I.E or CIE L.A.B. or an equivalent chromaticity diagram to a corresponding paint formulation. In step 46 the system dispenses the paints to the buyers. Alternatively, the system communicates the color coordinates of the device-dependent paint to a remote factory or paint dispenser, as shown in step 44. The remote dispenser then dispenses or otherwise prepares the paints having said color and delivers the paints to the buyers.

In accordance with one aspect of the present invention, each commercially available paint color from a palette, e.g., Benjamin Moore's paints, is associated or linked to a CIE colorimetric specification, and each device-dependent color is also associated or linked to a CIE colorimetric specification. Hence, each device-dependent color is associated with a paint color from the thousands of commercially available paint colors.

One advantage of the system in accordance with the present invention is that multiple rooms 10 can be set up in different locations and the buyers do not have to be in the same location or city. For example, one family member can be in one city and another family member in a different city and the system allows the family members to view the same paint color in the same setting and the family members can communicate with each other, e.g., by phone, to complete the selection and buying process. Another advantage is that if room 10 is located proximate to a factory or paint dispenser, the buyers can take possession of the paints soon after the selection is made.

Another advantage of the present invention is that the buyers can stand inside a real home setting and see how a paint color would look on a wall. This obviates the difficult mental process of projecting color from a small paint chip or even a larger paint chip on to a full size wall or room. This also addresses the concern studied by Dr. Xiao et al. discussed above.

Another advantage of the present invention is that the lighting or illumination in room 10 can be adjusted or changed to show the buyers how the paint color would look on a bright and sunny day, on a dark and cloudy day or any other ambient condition. This allows the buyers to observe the colors in more natural conditions, and also lets the buyers test the colors in different moods or environments. For example, a restaurant owner may need to see how a paint color would look in her restaurant under low light; a home owner in the sun belt may need to see how a paint color would look in year-round bright conditions; and another home owner in the Pacific Northwest may need a cheery color for the rainy season. The illumination can also be adjusted to mimic the outdoors.

Figure 4:
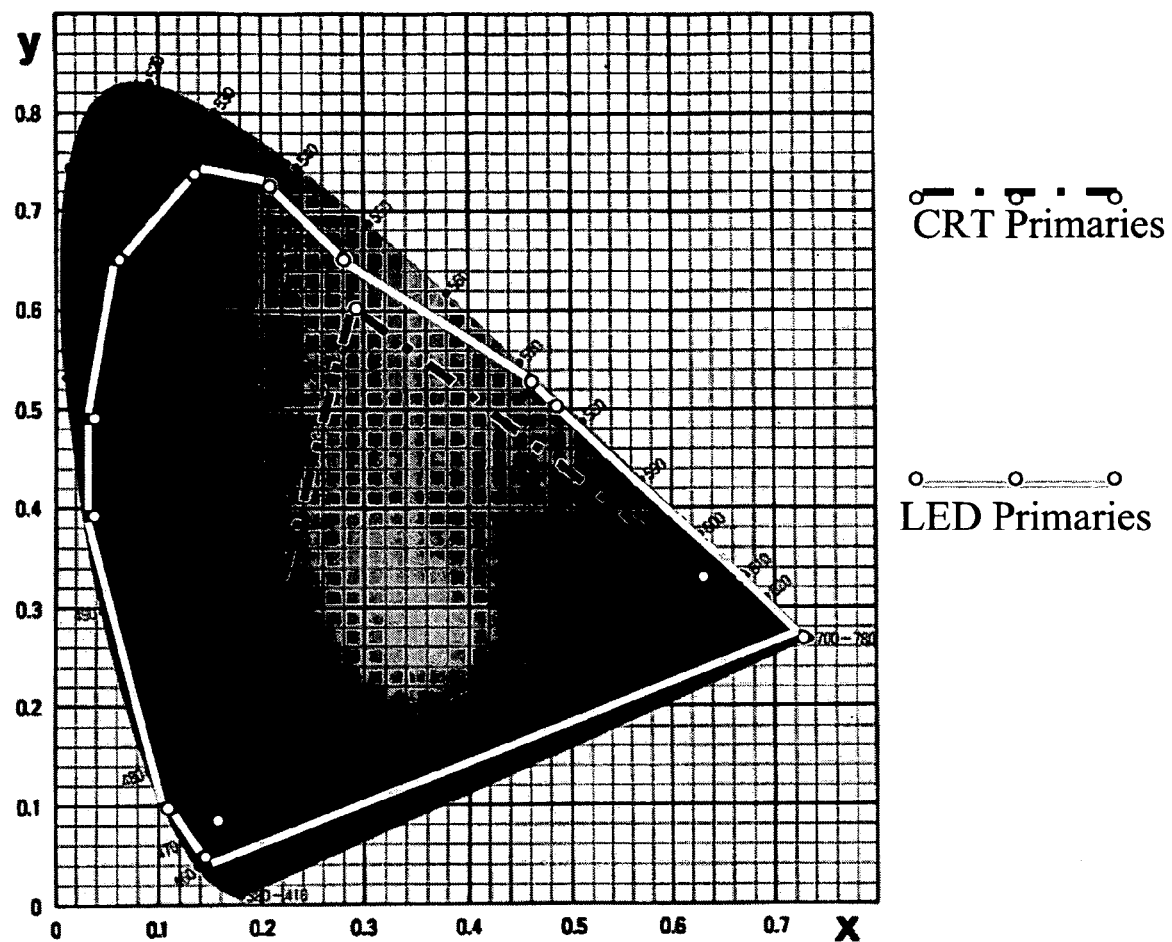
FIG. 4 is the 1931 CIE chromaticity diagram with two polygons representing displayable colors superimposed thereon.

Yet another advantage of the present invention is that a wider gamut of colors can be displayed in room 10 than on a computer screen. As discussed, most computer screens use the RGB color convention. In the embodiment where multiple color LEDs are used as shown in FIG. 4, or when white LEDs and color LEDs are used, more colors can be displayed for the buyers and hence more paint colors can be displayed. Broad band LEDs that are less than white can be used in combination with other broad band LEDs that are also less than white, or with narrow band LEDs.

An exemplary embodiment of wall portion 50 of room 10 using color LEDs is illustrated in FIGS. 5-7. Wall portion 50 can be wall 16 or any component thereof, e.g., upper portion 22, lower portion 24, moldings 20, 26, and door 18. Wall portion 50 can also be ceiling 28. Wall portion 50 comprises display surface 52, on which the device-dependent colors are displayed. Front surface 52 is supported by side panels 54 and front edge panels 56. Side panels 54 and display surface 52 is further supported by back panel 58. Back panel is movable toward and away from front screen 52. Wall portion 50 has two vertical lighting chambers 60 and two horizontal lighting chambers 62. Each lighting chamber 60 is defined by side panel 54, front panel 56, rear angled baffle partition 64 and first movable shutter baffle 68. First shutter baffle 68 is mounted on side panel 54 and is movable relative thereto to control the size of first opening 70. Similarly, each lighting chamber 62 is defined by side panel 54, front panel 56, rear angled baffle partition 64 and second movable shutter baffle 74. Second shutter baffle 74 is shown as being mounted to movable back panel 58 and is movable relative thereto to control the size of second opening 76. Second shutter baffle 74 can also be mounted to side panel 54 and be movable relative thereto, similar to first shutter baffle 68. Similarly, first shutter baffle 68 can be mounted to movable back panel 58 and be movable relative thereto.

Device-dependent light emitted from light source 72 mounted on baffle partition 64 reflects within the interior surfaces of lighting chamber 60 to balance emissitivity with diffusion. As used herein, diffuse, diffusion or diffusing means that light does not directly illuminating screen 52. Reflected light exits chambers 60 and 62 through openings 70 and 76 and partially reflect off of back panel 54 before illuminating front screen 52. The object is to evenly illuminate screen 52 to show how wall portion 50 would look after it is evenly "painted" with a device-dependent color that substantially resembles a real wall painted with a true color. The illumination of screen 52 can be controlled by a plurality of factors, including but not limited to (i) the illumination power of light source 72, (ii) the angle between baffle partition 64 and front panel 56, (iii) the dimensions of openings 70 and 72 as controlled by the positions of movable shutter baffles 68 and 74 (and/or movable back panel 58), and (iv) the dimensions of cavity 78 behind screen 52 controlled by the position of movable back panel 58.

Preferably, light source 72 comprises a plurality of narrow or broadband LEDs, as discussed above. Suitable LED devices include, but are not limited to, the ColorBlaze 72 available from Color Kinetics, Inc. of Boston, Mass. Preferably, the angle between baffle partition 64 and front panel 56 ranges between 15° and 85°, more preferably between 30° and 60°, and most preferably between 40° and 50°. Openings 70 and 72 and cavity 78 can be adjusted to any size to ensure that screen 52 is evenly illuminated, and are preferably adjusted regularly to ensure even illumination. A plurality of fans 80 to carry away the heat generated by light 72 can be provided, as shown.

In accordance with another aspect of the present invention, the surface of screen 52 can be altered to display the finishing or gloss of the paints. Typically, paints come in various finishes, e.g., gloss, semi-gloss, satin, matted and flat. These finishes provide the paints with a different look and feel after the paints dry. In one embodiment, screen 52 may have similar surface textures as the paint finishes. In other words, screen 52 can be manufactured by various processes or the additives can be added to the polymeric screen materials to change the surface textures thereof. In one example, a roll of screen material can have the different textures to simulate the different finishes, and depending on the buyers' choice the requested texture is rolled out to cover wall section 50. Alternatively, room 10 may have a textured light source that can simulate a texture pattern onto screen 52 to create an image of a sheen or finish. This textured light source illuminates the front surface of screen 52 and the light from light source 72 would illuminate the back surface of screen 52.

Room 10 can be used at retailers, paint stores and other paint dispensers, trade shows, offices, restaurants, airports, train stations, and other public buildings.

While it is apparent that the illustrative embodiments of the invention disclosed herein fulfill the objectives stated above, it is appreciated that numerous modifications and other embodiments may be devised by those skilled in the art. One such modification is that the system of the present invention can be scaled down to a hand held device that can project with LED light the device-dependent colors onto a wall. Such a scaled down version can be used in the buyers' homes. Another possible modification is to incorporate the system of the present invention with image projection device so that images or text in addition to color simulation can be projected onto screen 52. Therefore, it will be understood that the appended claims are intended to cover all such modifications and embodiments, which would come within the spirit and scope of the present invention.

We claim:

1. A method for selecting a paint comprising the steps of
   (a) providing a first device-independent color;
   (b) displaying a first device-dependent color having a color coordinate substantially matching the color coordinate of the first device-independent color, by combining at least five non-repeating primary colors to substantially match the color coordinate of the first device-independent color;
   (c) selecting second device-dependent color wherein the device-dependent colors are controlled by a controller or a CPU; and
   (d) selecting a paint having a second device-independent color that has a color coordinate substantially matching the color coordinate of the second device-dependent color.

2. The method of claim 1, wherein the first device-dependent color and the second device-dependent color have substantially the same color coordinate.

3. The method of claim 1, wherein the first device-dependent color and the second device-dependent color have different color coordinates.

4. The method of claim 1 further comprising the additional steps of (e) obtaining the user's input concerning the displayed device-dependent color and (f) displaying another device-dependent color based on the user's input after step (b).

5. The method of claim 4, wherein steps (e) and (f) are repeated until step (c) occurs.

6. The method of claim 4, wherein the second device-dependent color and said another device-dependent color have substantially the same color coordinate.

7. The method of claim 1, wherein step (a) comprises the step of scanning a bar code representing the first device-independent color.

8. The method of claim 1, wherein step (a) comprises the step of providing a voice recognition device to receive the first device-independent color.

9. The method of claim 1, wherein step (a) comprises the step of providing a spectrographic scanner to scan a color.

10. The method of claim 1, wherein step (b) comprises the step of providing a plurality of LEDs to provide the device-dependent color.

11. The method of claim 10, wherein the LEDs comprise color LEDs.

12. The method of claim 10, wherein the LEDs comprise at least one white LED.

13. The method of claim 10, wherein step (b) comprises the step of providing a polymer light emitting device.

14. The method of claim 1, wherein the color coordinates are located on a CIE chromaticity diagram.

15. The method of claim 14, wherein the color coordinates are located on the 1931 CIE chromaticity diagram.

16. The method of claim 14, wherein the color coordinates are located on the 1964 CIE chromaticity diagram.

17. The method of claim 14, wherein the color coordinates are located on the 1976 CIELAB chromaticity diagram.

18. The method of claim 14, wherein the color coordinates are located on the 1976 CIELUV chromaticity diagram.

19. The method of claim 1, wherein step (b) comprises the step of displaying the device-dependent color on a screen with a light wherein the light displaying the device-dependent color is diffused before illuminating the screen.

20. The method of claim 19, wherein the light passes through a shutter opening before illuminating the screen.

21. The method of claim 20, wherein the size of the shutter opening is variable.

22. The method of claim 19, wherein at least some of the light reflects off of a back panel before illuminating the screen.

23. The method of claim 22, wherein the back panel is movable relative to the screen.

24. The method of claim 1, wherein step (d) occurs proximate to step (b).

25. The method of claim 1, wherein step (d) occurs distant from step (b).

26. The method of claim 1 further comprising the step of (g) displaying a finish with the device-dependent color.

27. The method of claim 26, wherein step (g) comprises the step of providing a textured surface to display the device-dependent color.

28. The method of claim 26, wherein step (g) comprises the step of illuminating a surface displaying the device-dependent color with a light simulating texture.

29. The method of claim 1 further comprising the step of (h) suggesting colors that are harmonious with the displayed colors.

30. The method of claim 29 wherein step (h) further comprising selecting harmonious colors belonging to a tintometric system.

31. The method of claim 4, wherein the second device-dependent color and the another device-dependent color are provided by at least five sources of light.

32. The method of claim 31, wherein the first, second and another device-dependent colors are provided by at least nine sources of light.

33. The method of claim 32, wherein the first, second and another device-dependent colors are provided by at least eleven sources of light.

34. The method of claim 1, wherein step (d) further includes the step of dispensing said paint.

35. A method for selecting a paint comprising the steps of
   (a) providing a first device-independent color;
   (b) displaying a first device-dependent color, having a color coordinate substantially matching the color coordinate of the first device-independent color, by combining a plurality of LEDs to substantially match the color coordinate of the first device-independent color before displaying the first device-dependent color;
   (c) selecting a second device-dependent color wherein the device-dependent colors are controlled by a controller or a CPU; and
   (d) selecting a paint having a second device-independent color that has a color coordinate substantially matching the color coordinate of the second device-dependent color.

36. The method of claim 35 further comprising the additional steps of (e) obtaining the user's input concerning the displayed device-dependent color and (f) displaying another device-dependent color based on the user's input after step (b).

37. The method of claim 36, wherein the second and the another device dependent colors are provided by a plurality of LEDs.

38. The method of claim 37, wherein the LEDs comprise at least one white LED.

39. The method of claim 37, wherein the LEDs comprise color LEDs.

40. The method of claim 35, wherein step (b) comprises the step of displaying the device-dependent color on a screen with a light wherein the light displaying the device-dependent color is diffused before illuminating the screen.

41. The method of claim 35 further comprising the step of (g) displaying a finish with the device-dependent color.

42. The method of claim 35 further comprising the step of (h) suggesting colors that are harmonious with the displayed colors.

43. The method of claim 35, wherein step (d) further includes the step of dispensing said paint.

44. A method for selecting a paint comprising the steps of
(a) providing a first device-independent color;
(b) displaying a first device-dependent color, having a color coordinate substantially matching the color coordinate of the first device-independent color, on a wall portion sized and dimensioned to be substantially similar to a full size wall, wherein the device-dependent color is diffused and displayed on a front surface of the wall portion, wherein the diffused device-dependent color does not directly illuminate the front surface;
(c) selecting a second device-dependent color wherein the device-dependent colors are controlled by a controller or a CPU; and
(d) selecting a paint having a second device-independent color that has a color coordinate substantially matching the color coordinate of the second device-dependent color.

45. The method of claim 44, wherein step (b) comprises the step of providing at least five light sources to provide the device-dependent color.

46. The method of claim 44, wherein step (b) comprises the step of providing a plurality of LEDs to provide the device-dependent color.

47. The method of claim 44, further comprising the additional steps of (e) obtaining the user's input concerning the displayed device-dependent color and (f) displaying another device-dependent color based on the user's input after step (b).

48. The method of claim 47, wherein the second and the another device dependent colors are displayed on a wall portion sized and dimensioned to be substantially similar to a full size wall, wherein the device-dependent colors are displayed uniformly on a front surface of the wall portion.

49. The method of claim 44, wherein step (b) comprises the step of displaying the device-dependent color on a screen with a light wherein the light displaying the device-dependent color is diffused before illuminating the screen.

50. The method of claim 44 further comprising the step of (g) displaying a finish with the device-dependent color.

51. The method of claim 44 further comprising the step of (h) suggesting colors that are harmonious with the displayed colors.

* * * * *